N. INGALLS, Jr.
Trimming Attachments for Sewing-Machines.

No. 212,602.  Patented Feb. 25, 1879.

Witnesses
S. N. Piper
A. N. Livermore

Inventor.
Nathaniel Ingalls, Jr.
by attorney
R. H. Eddy

UNITED STATES PATENT OFFICE.

NATHANIEL INGALLS, JR., OF BOSTON, MASSACHUSETTS.

IMPROVEMENT IN TRIMMING ATTACHMENTS FOR SEWING-MACHINES.

Specification forming part of Letters Patent No. 212,602, dated February 25, 1879; application filed June 26, 1878.

*To all whom it may concern:*

Be it known that I, NATHANIEL INGALLS, Jr., of Boston, of the county of Suffolk and State of Massachusetts, have invented a new and useful Improvement in Trimming Mechanism for Sewing-Machines; and do hereby declare the same to be described in the following specification and represented in the accompanying drawings, of which—

Figure 1:
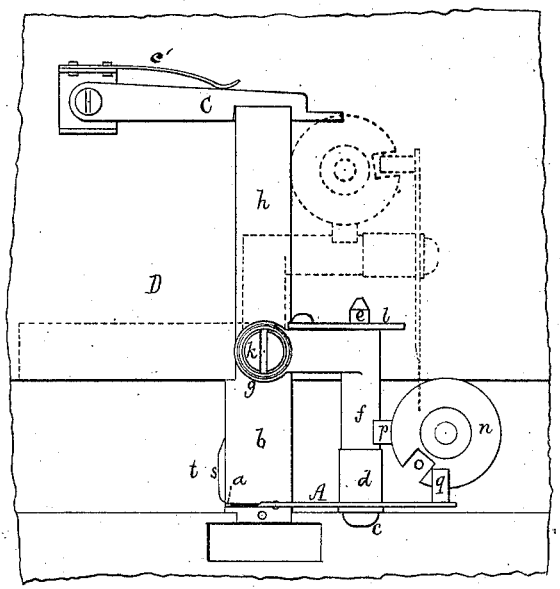
Figure 2:
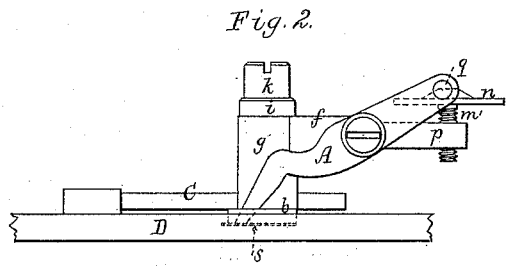
Figure 3:
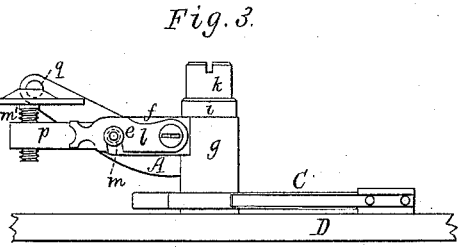
Figure 4:
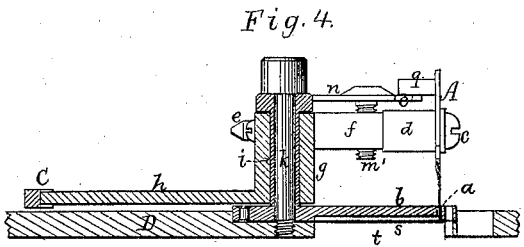
Figure 5:
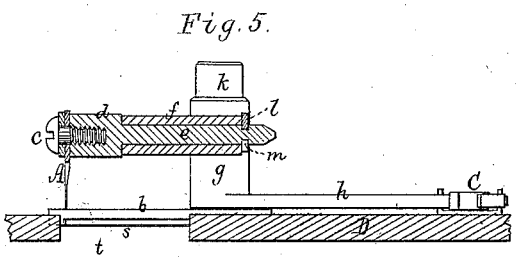

Figure 1 is a top view, Fig. 2 a front elevation, Fig. 3 a rear view, and Figs. 4 and 5 longitudinal sections, of it as applied to the base-plate of a needle-and-shuttle sewing-machine.

The invention consists as follows: first, in a spring or elastic trimmer-guard, arranged beneath the work-support plate, in combination therewith and with the trimmer and its carrier, such trimmer being pivoted to the said carrier, and extended through a slot in the work-support plate and resting on the said guard; second, in a screw and its notched head and supporting device or devices, in combination with the trimmer having a stud, and arranged with and pivoted to an arm, all as set forth; third, in the combination of an arm, and a latch and its spring, with a post, a carrying-arm, and the trimmer applied thereto, as specified and represented.

The invention relates to the class of work-trimmers that are pressed downward and caused to cut by the needle-carrier in its descent to force the needle into the work, such a trimmer being shown at A in the drawings. It projects into a slit, $a$, in the work-support plate $b$, and is fastened by a clamp-screw, $c$, to the head $d$ of a bolt or journal, $e$, such bolt extending through and having a bearing in an angular arm, $f$, projecting from a vertical post, $g$, and formed as represented. From such post another or straight arm, $h$, extends backward, and engages with a notched latch, C, pivoted to the base-plate D, and held against the arm $h$ by a spring, $c'$. Within the post is a tubular bushing, $i$, through which and the plate $b$ a screw, $k$, passes, and screws into the plate D.

The arm $f$ is provided with a latch, $l$, to take into a groove, $m$, made transversely in and around the bolt or journal $e$, such latch and groove serving, when in engagement, to keep the bolt or journal in place in the arm, and to allow the bolt to turn with the trimmer or knife.

A screw, $m'$, furnished with a broad and flat head or disk, $n$, notched at its periphery in manner as shown at $o$, screws down into or through a projection, $p$, of the arm $f$. From the rear part of the trimmer a stud, $q$, is extended directly over the said notched head $n$. While the stud may be on the top of the head the knife will be prevented thereby from being drawn out of the slit in the work-support plate; but on revolving the head $n$ sufficiently to carry the notch immediately under the stud, the knife may be raised out of the slit in order for such knife and the carrying-arm to be swung around into the positions shown in Fig. 1 by dotted lines, when it may not be desirable to use the trimmer, or when it is desirable to sew without trimming the work.

Furthermore, when the notch is directly under the stud, the trimmer may be moved out of the work-support plate, and on throwing up the latch $l$ such trimmer and its pivot or journal may be drawn away from the carrying-arm, in order for the trimmer to be sharpened or for any other purpose.

The screw and its notched head serve to gage the extent of penetration of the trimmer in or through the work-support plate, the lower end of the trimmer resting against a broad spring or elastic plate, $s$, arranged beneath said work-support plate, at a short distance therefrom, and fixed to the base-plate. This spring serves not only to move or aid in moving the knife or trimmer upward after each depression of it, but to guard it from being struck by the shuttle, whose race $t$ extends under and across the work-support plate.

The space between the spring or guard $s$ and the work-support plate is to lessen the liability of the spring being choked by thread getting between it and said plate.

The bushing $i$ prevents its clamp-screw from working loose when the post is revolved.

Having thus described my invention, what I claim is as follows:

1. The spring or elastic trimmer-guard $s$, arranged beneath the work-support plate $b$, in combination therewith and with the trimmer A and its carrier $f\ g$, such trimmer being pivoted to the said carrier, and extended through a slot in the work-support plate and resting on the said guard, all substantially as set forth.

2. The screw $m'$ and its notched head $n$, and supporting device or devices $g\ f\ p$, in combination with the trimmer A, having the stud $q$, and arranged with and pivoted to the arm $f$, all being substantially as specified.

3. The combination of the arm $h$, and the latch C and its operative spring, with the post $g$, the carrying-arm $f$, pin $e$, and the trimmer A, applied thereto as specified.

NATHANIEL INGALLS, Jr.

Witnesses:
  R. H. EDDY,
  S. N. PIPER.